Patented Jan. 29, 1946

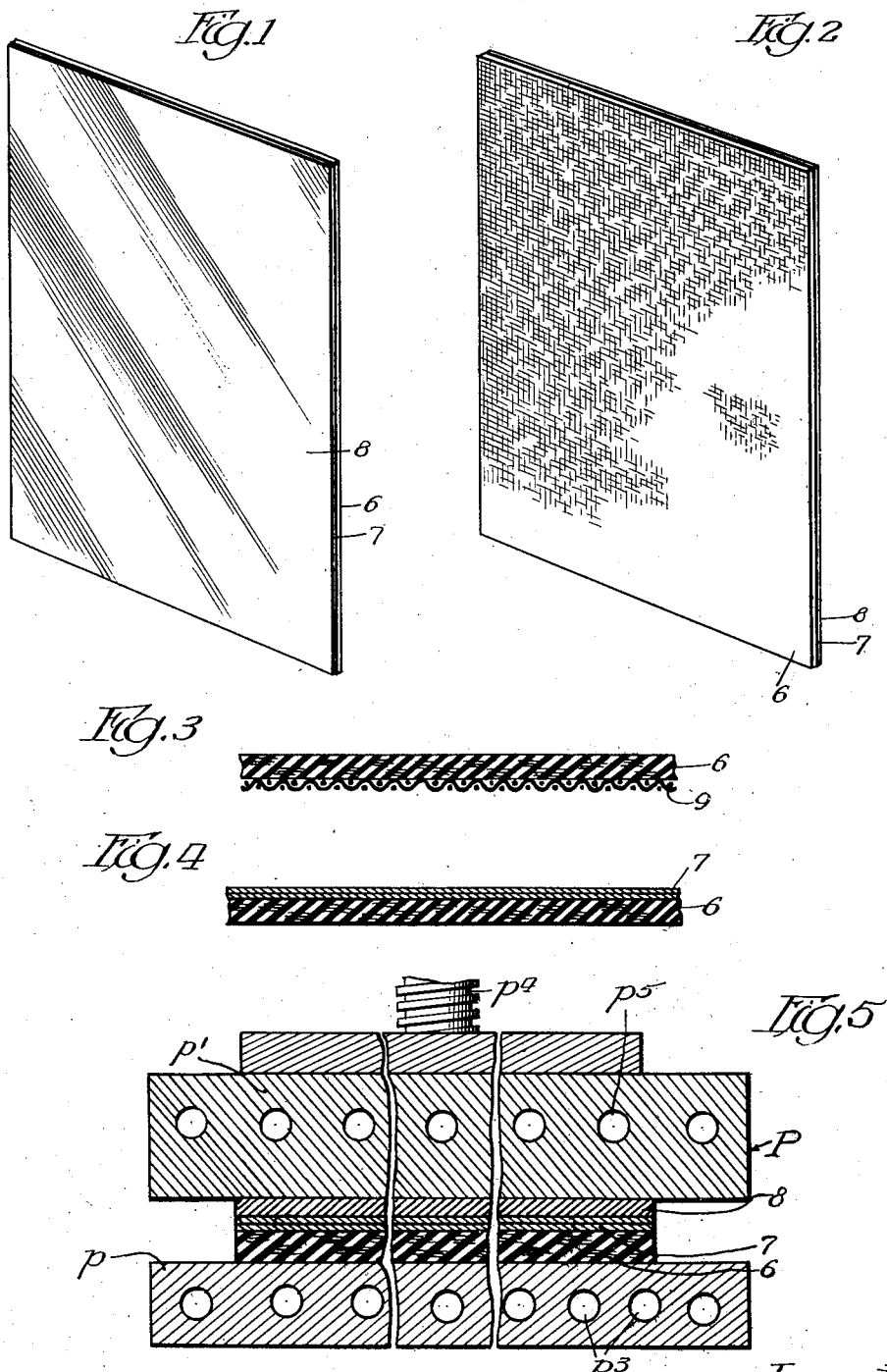

2,393,843

UNITED STATES PATENT OFFICE 2,393,843

COMPOSITE PANEL

Paul Van Cleef, Chicago, Ill., assignor, by mesne assignments, to Van Cleef Bros., Chicago, Ill., a partnership composed of Noah Van Cleef, Felix Van Cleef, Paul Van Cleef, Frances G. Van Cleef, Ruth Van Cleef, and Jeanne Van Cleef Application January 29, 1941, Serial No. 376,429

2 Claims. (Cl. 154—45.9)

The present invention relates generally to panels. More particularly the invention relates to that type of panel which is used instead of veneer as a covering for a wall or one of the surfaces of a piece of furniture, such for example, as a desk or bed.

It has heretofore been proposed to employ or use as a panel of the aforementioned type a thin sheet of synthetic resin of the phenol-formaldehyde variety or the urea-formaldehyde variety. Such a panel is in most instances applied by way of an adhesive to the work surface and when in place serves as an ornamental or finish type covering. In practice it has been found that a panel of the type under consideration, although it effectively and efficiently serves its intended purpose, is subject to certain objections. In the first place, such a panel is so brittle and fragile that it often cracks or breaks during transportation to the place of application or in connection with application to the work surface. Secondly, it is difficult to bond the panel to the work surface because its inner face is smooth and hence the adhesive used in connection with application does not readily adhere to it. Thirdly, any small projections or surface irregularities on the work surface disturb the smoothness of the outer face of the panel.

The primary object of this invention is to provide a panel which is an improvement upon, and eliminates the defects of, previously designed panels of the same general type or character by reason of the fact that it is of composite design and comprises in addition to the sheet of synthetic resin a comparatively thin backing sheet which is formed of a homogeneous mixture of ground cork and vulcanized rubber and is cemented to the inner face of the main or principal sheet. By employing a backing sheet of this type the sheet of synthetic resin is so reinforced or strengthened that it is not likely to crack or rupture during transportation to the place of installation or application to the work surface. Another advantage of employing a backing sheet in the form of a homogeneous mixture of ground cork and rubber resides in the fact that the panel as a whole may be readily mounted or secured in place because of the affinity of the backing sheet for the adhesive which is used to secure the composite panel to the work surface. A further advantage resides in the fact that such a backing sheet is compressible or plastic to a certain extent and hence absorbs or accommodates any minute or small projections or irregularities on the work surface and thus eliminates unevenness in the outer face of the sheet of synthetic resin. A still further advantage of employing a backing sheet of the type here under consideration resides in the fact that the panel as a whole, i. e., the composite panel, has sound deadening properties due to the resiliency of the backing sheet.

Another object of the invention is to provide a composite panel of the last mentioned type and character in which the back face of the backing sheet is provided with certain irregularities or unevenness due to the method by which the backing sheet is made and hence has a marked or pronounced affinity for the adhesive for securing the panel to the work surface.

A further object of the invention is to provide a composite panel which is generally an improvement in the art and not only has novel characteristics or properties but also may be manufactured at a low and reasonable cost.

Other objects of the invention and the various advantages and characteristics of the present composite panel will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a front perspective view of a composite panel embodying the invention;

Figure 2 is a rear perspective view showing in detail the surface irregularities of the back face of the cork-vulcanized rubber backing sheet;

Figure 3 is a section showing the material of which the backing sheet is formed, prior to vulcanization of the rubber content and after it has been calendered onto a fabric liner;

Figure 4 is a section showing the backing sheet after removal of the fabric liner at the conclusion of the vulcanizing operation and after application to its calendered or front face of a plurality of coats of dry type rubber-rosin cement; and Figure 5 is a section showing the backing sheet and the sheet of synthetic resin in a steam heated press and being subjected to the action of heat and pressure for purposes of cementing or bonding them together.

The panel which is shown in Figures 1 and 2 of the drawing constitutes the preferred form or embodiment of the invention. It is designed to be used as a covering for a wall or other surface and as its parts comprises a backing sheet 6, a cement coating 7 and an outer or finish sheet 8. The backing sheet is formed for the most part of ground cork and vulcanized rubber, as hereinafter described, and is united or bonded to the rear or inner face of the finish sheet 8 by way of the cement coating 7. It has a four-fold purpose in that it serves—(a) to reenforce or strengthen the brittle finish sheet 8 and thus prevent cracking or rupturing of the latter; (b) to facilitate mounting or application of the panel as a whole on the work surface; (c) to eliminate any unevenness in the front or outer face of the sheet 8 by absorbing or accommodating any projections or irregularities on the surface to which the panel is applied; and (d) to back the finish sheet 8 in a resilient manner and thus cause the composite panel to act as a sound or noise absorbing medium. The backing sheet 6 may be of any desired thickness. For practical purposes it has been found that if the backing sheet has a thickness of approximately $\frac{3}{32}$ of an inch it is both suitable and economical and affords the finish sheet 8 an efficient and effective backing. The finish sheet 8 is formed of synthetic resin of any of the varieties which are now on the market or obtainable, such as the phenol-formaldehyde variety (Bakelite) and the urea-formaldehyde variety. It preferably has a thickness of approximately 1/64 of an inch and is so formed that the outer face thereof is shiny or glossy while its inner or rear face is dull. Sheets or layers (not shown) of paper are embedded in the backing sheet for purposes of reinforcement. So far as the composite panel as a whole is concerned the finish sheet 8 when in its operative position serves as an ornamental finish type covering. In installing the panel any suitable adhesive is applied to the rear face of the backing sheet 6 and the panel is then pressed against the work surface. Upon hardening or setting of the adhesive the panel is bonded to the surface and remains securely in place.

The backing sheet 6 of the panel is formed of the following ingredients in substantially the proportions set forth:

| | |
|---|---|
| Crude rubber_____pounds__ | 32 |
| Ground cork_____do____ | 40 |
| Mineral filler_____do____ | 2 |
| Sulphur_____do____ | 1 |
| Accelerator_____ounces__ | 6 |

In forming the backing sheet the crude rubber is broken down by milling it. Thereafter the mineral filler, sulphur and accelerator are added to the milled rubber. After mixing together the rubber, mineral filler, sulphur and accelerator the ground cork is added to, and worked into, the mixture. In practice it has been found that the best results have been obtained when the cork has a mesh running from 16 to 30. The milling or mixing operation causes or effects a uniform distribution of the cork particles throughout the rubber. With cork particles having a mesh no greater than 16 and no less than 30 the resultant sheet has the desired or proper texture. After proper mixing of the aforementioned ingredients the material is calendered onto a non-sticking or non-adhesive liner 9 of linen, cotton, or like textile fabric. As well understood in the art the calendering roll is set so as to calender the material onto the liner so that it has the desired depth or thickness. After the calendering operation the material and the fabric liner are placed in an oven or dry heat vulcanizer for a sufficient period of time to effect complete cure or vulcanization of the rubber part or content of the material. After the vulcanizing step the ground cork and vulcanized rubber mixture or material is in its final or completed form and constitutes the backing sheet 6. The fabric liner 9 does not form any part of the composite panel. It is merely used in connection with the formation or fabrication of the backing sheet 6. When the material from which the backing sheet 6 is formed is calendered onto the liner 9 the face in contact with the liner, i. e., the back face of the material shows the impressions of the liner. In other words the back face of the sheet 6 simulates the surface contour of the liner due to the fact that the warp and woof of the liner become embedded in the plastic material. The back face of the sheet, upon removal of the liner, is pronouncedly irregular (see Figure 2) and hence it has an extremely great affinity for the adhesive which is used in securing the panel in place. The backing sheet is pliable as well as resilient due to the fact that for the most part it consists of vulcanized rubber and ground cork.

In connection with fabrication of the panel the cement coating 7 is applied to the entire front or inner face of the backing sheet 6. Such coating is preferably applied by spreading with a doctor knife two or more coats of a rubber rosin composition which is formed of the following ingredients in substantially the proportions specified.

| | Pounds |
|---|---|
| Rubber (inner tube reclaim)_____ | 39 |
| Zinc oxide or other mineral filler_____ | 39 |
| Wood rosin_____ | 39 |
| Slaked lime_____ | 2 |

The aforementioned ingredients are milled or mixed together and then dissolved in approximately 35 gallons of rubber solvent, such as naphtha. After spreading of two or more coats of the composition on the front face of the backing sheet 6 the solvent is permitted to evaporate. The cement type mass or material remaining after evaporation of the solvent constitutes the cement coating 7. Such coating is essentially a dry type rubber-rosin cement which is capable of being energized by heat and pressure.

After application of the coating 7 of cement type material to the inner face of the backing sheet 6 the facing or finish sheet 8 is united or bonded to the sheet 6 by way of the coating. This is accomplished by placing the finish sheet so that the rear or dull face thereof is in contact with the coating 7. Thereafter the two sheets are placed in a press P as illustrated in Figure 5. The press P is illustrated in a diagrammatic manner and consists of a platen-type stationary member $p$ and a platen-type movable member $p^1$. The stationary member $p$ has a continuous duct $p^3$ through which steam is adapted to be circulated for heating purposes. The member $p^1$ of the press P is movable vertically to and from the stationary member by way of a screw $p^4$ or other power type raising and lowering device and has a continuous steam duct $p^5$ therein. It is contemplated that the members $p$ and $p^1$ of the press be steam heated to a temperature of approximately 150° F. before the cement coated backing sheet 6 and the finish sheet 8 of synthetic resin are inserted into place. Such sheets are mounted in assembled relation with the press by placing them on the member $p$, as shown in Figure 5. Thereafter the movable member $p^1$ of the press is lowered by proper manipulation of the screw $p^4$ and is forced by the latter downwards in order to exert the proper or desired amount of pressure on the two sheets. While the sheets are under pressure in the press the heat softens the cement and makes it tacky and the pressure which is exerted by the movable member $p^1$ of the press causes adhesion of the finish sheet 8 and the coating. Ordinarily the two sheets will be effectively and efficiently bonded together by the coating if permitted to remain in the heated press for a period of approximately five minutes. At the end of such period the movable member $p^1$ of the press is raised and the composite panel in its completed form is removed from the compartment $p^2$. As soon as the panel is removed from the compartment it is in condition or readiness for use. The cement coating 7, by reason of the fact that it is formed for the most part of rubber and rosin, is slightly elastic and hence permits of ready flexing of the panel while at the same time it serves as a permanent bonding medium between the backing and finish sheets.

The backing sheet 6, the coating 7 of cement type material, and the finish sheet 8 of synthetic resin are conterminous, as shown in Figures 1 and 2.

The herein described composite panel is both durable and practical because of the reenforcement which is provided by the ground cork-vulcanized rubber backing sheet. It is capable of being flexed to a comparatively great extent without cracking or rupture of the finish sheet 8 and is capable of absorbing sound or noise because of the resiliency of the backing sheet. The method of fabricating or manufacturing the panel is essentially a simple one and hence the panel may be produced at a low and reasonable cost.

It is to be understood that the invention is not to be restricted to the details set forth since these may be modified within the scope of the appended claims without departing from the spirit and scope of the invention.

Having thus described the invention what I claim as new and desire to secure by Letters Patent is:

1. As a new article of manufacture, a composite panel adapted to be adhesively connected to, and to serve as a cover for, a wall or other work surface and comprising a front finish sheet formed of synthetic resin, a substantially coextensive backing sheet disposed in back of the finish sheet, formed for the most part of vulcanized rubber and a slightly greater amount by weight of ground cork particles distributed substantially uniformly throughout the rubber and having a mesh running from 16 to 30, and embodying an adhesive receiving rear face with a contour simulating textile fabric, and a coating of flexible and elastic rubber-rosin cement between the two sheets and serving permanently to bond the latter together.

2. As a new article of manufacture, a composite panel adapted to be adhesively connected to, and to serve as a cover for, a wall or other work surface and comprising a thin front sheet formed of synthetic resin and having a smooth glossy outer face and a dull or rough inner face, a thicker substantially coextensive backing sheet disposed in back of the finish sheet, formed for the most part of vulcanized rubber and a slightly greater amount by weight of ground cork particles distributed substantially uniformly throughout the rubber and having a mesh running from 16 to 30, and embodying an adhesive receiving rear face with a contour simulating textile fabric, and a coating of flexible and elastic rubber-rosin cement between the two sheets and serving permanently to bond the latter together.

PAUL VAN CLEEF.